United States Patent [19]
Matsumoto

[11] Patent Number: 5,818,136
[45] Date of Patent: Oct. 6, 1998

[54] DRIP-PROOF STRUCTURE FOR ENGINE GENERATOR

[75] Inventor: Takehiro Matsumoto, Gumma, Japan

[73] Assignee: Sawafuji Electric Co., Ltd., Tokyo, Japan

[21] Appl. No.: 919,237

[22] Filed: Aug. 28, 1997

[30] Foreign Application Priority Data

Aug. 29, 1996 [JP] Japan .................................. 8-228894

[51] Int. Cl.⁶ .............................. H02K 5/10; H02K 5/00
[52] U.S. Cl. ................................................. 310/88; 310/89
[58] Field of Search ............................... 310/88, 89, 258, 310/217

[56] References Cited

U.S. PATENT DOCUMENTS

| | | | |
|---|---|---|---|
| 2,527,704 | 10/1950 | Carson | 310/89 |
| 2,743,385 | 4/1956 | Potter | 310/157 |
| 3,308,317 | 3/1967 | Allenbaugh | 310/88 |
| 4,086,507 | 4/1978 | Roland et al. | 310/80 |
| 4,220,880 | 9/1980 | Woodard | 310/89 |
| 4,720,648 | 1/1988 | DeVries et al. | 310/89 |
| 4,766,337 | 8/1988 | Parkinson et al. | 310/89 |
| 4,886,989 | 12/1989 | Britt | 310/89 |
| 5,045,736 | 9/1991 | Amano et al. | 310/88 |

FOREIGN PATENT DOCUMENTS 2-23089  6/1990  Japan .

OTHER PUBLICATIONS

Abstract of European Patent Publ. No. 03235644, dated Oct. 21, 1991.

Abstract of European Patent Publ. No. 08149739, dated Jun. 7, 1996.

*Primary Examiner*—Clayton E. LaBalle
*Attorney, Agent, or Firm*—Nikaido, Marmelstein, Murray & Oram LLP

[57] ABSTRACT

In an engine generator in which first and second brackets both in a cylindrical shape clamp an annular core therebetween and a plurality of exhaust ports are provided in the first bracket corresponding to a cooling fan provided on a rotor, for exhausting air from the cooling fan to the outside. A cover made of a synthetic resin covers from above the first bracket having on its external surface engagement surfaces which face the side opposite to the annular core, and a portion of the annular core on the first bracket side. The cover is integrally provided with a plurality of fitting portions which engage with respective bosses of the first bracket from the annular core side and are elastically fitted with respective fastening bolts, and engagement portions which engage with the engagement surfaces. It is possible, therefore, to easily prevent water from entering through the exhaust ports without the need to change the shape of the first bracket.

3 Claims, 8 Drawing Sheets

DRIP-PROOF STRUCTURE FOR ENGINE GENERATOR

BACKGROUND OF THE INVENTION

1. Field of the Invention

The present invention relates to a drip-proof structure for preventing entrance of water through a plurality of exhaust ports provided in an engine generator in which first and second cylindrical brackets clamp an annular core therebetween and the exhaust ports are provided in the first bracket corresponding to a cooling fan provided on a rotor, for exhausting air from the cooling fan to the outside.

2. Description of the Related Art

Such an engine generator is already known in Japanese Utility Model Publication No. 2-23089 and the like.

In order to improve the cooling efficiency by smoothly exhausting air from the cooling fan to the outside, the total opening area of the exhaust ports needs to be made relatively large by increasing the number of exhaust ports provided in the first bracket, and thus, it is desirable that the exhaust ports be provided over a broad area of a side wall of the first bracket. For this reason, the exhaust ports are provided not only in the lower half but also in the upper half of the first bracket, but in this case, rainwater may enter through the exhaust ports provided in the upper half of the first bracket. In the aforesaid conventional structure, hood portions which extend outward to cover the respective exhaust portions from above are provided continuously at the upper edges of the exhaust ports provided in the upper half of the first bracket.

However, in order to obtain the above-described conventional drip-proof structure, it is necessary to modify a casting die for the first bracket which is a cast article, and if the above-described conventional drip-proof structure is to be given to engine generators which are already commercially available or in stock, it is necessary to replace the first bracket.

SUMMARY OF THE INVENTION

The present invention has been made in view of the above-described problems, and its object is to provide a drip-proof structure for an engine generator which is capable of easily preventing entrance of water through exhaust ports without the need to change the shape of the first bracket.

To achieve the above object, in accordance with the present invention, a drip-proof structure for an engine generator is provided wherein first and second cylindrical brackets clamp an annular core therebetween, bosses which project outward from external surfaces of the first and second brackets are provided at a plurality of locations on the external surfaces of the first and second brackets correspondingly to each other, a housing is formed by fastening the bosses of the first and second brackets to each other with fastening bolts, a rotor is rotatably supported in the housing, a cooling fan is secured to the rotor at a position which corresponds to the first bracket, and a plurality of exhaust ports which are spaced apart in a circumferential direction are provided in a side wall of the first bracket, and wherein a cover made of a synthetic resin is provided to cover from above the first bracket having on its external surface engagement surfaces which face a side opposite to the annular core, and a part of the annular core on the first bracket side, said cover is integrally provided with a plurality of fitting portions which engage with the respective bosses of the first bracket from the annular core side and are elastically fitted with the respective fastening bolts, and engagement portions which engage with the engagement surfaces.

According to the above-described constitution, the respective fitting portions are brought into engagement with the bosses and are elastically fitted into the respective fastening bolts, and furthermore, the respective engagement portions are brought into engagement with the engagement surfaces of the first bracket, so that the cover is prevented from moving in the axial and radially outward directions of the first bracket. Part of the annular core which is located on the first bracket side, and the first bracket can be covered with the cover, so that it is possible to prevent entrance of water through the exhaust ports provided in the first bracket. Accordingly, it is possible to easily obtain a drip-proof structure by simply fitting the cover to an engine generator which is already commercially available or in stock, without the need to modify a casting die for the first bracket which is a casting.

The above and other objects, feature and advantages of the present invention will become apparent from the following detailed description of preferred embodiments, taken in conjunction with the accompanying drawings.

BRIEF DESCRIPTION OF THE DRAWINGS

FIGS. 1 through 7 show a first embodiment of the present invention, wherein

FIG. 1 is a longitudinal sectional side view of an engine generator to which a cover is mounted, FIG. 2 is a cross-sectional view taken along a line 2—2 in FIG. 1, FIG. 3 is a view taken along an arrow 3 in FIG. 1, FIG. 4 is a plan view of the cover, FIG. 5 is a sectional view taken along a line 5—5 in FIG. 4, FIG. 6 is a sectional view taken along a line 6—6 in FIG. 4, and FIG. 7 is a sectional view taken along a line 7—7 in FIG. 4.

DESCRIPTION OF THE PREFERRED EMBODIMENTS

Figure 1:
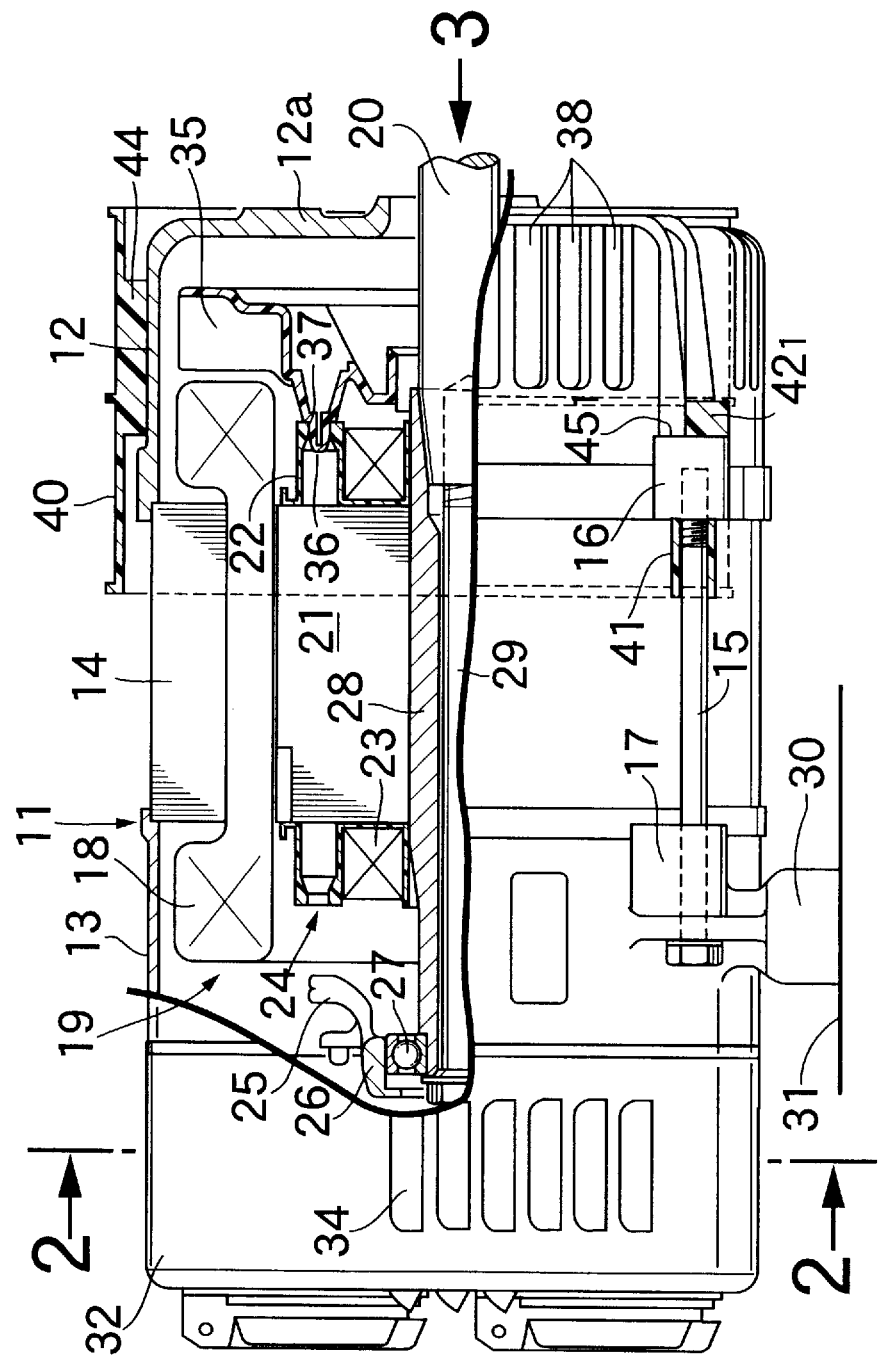
Figure 2:
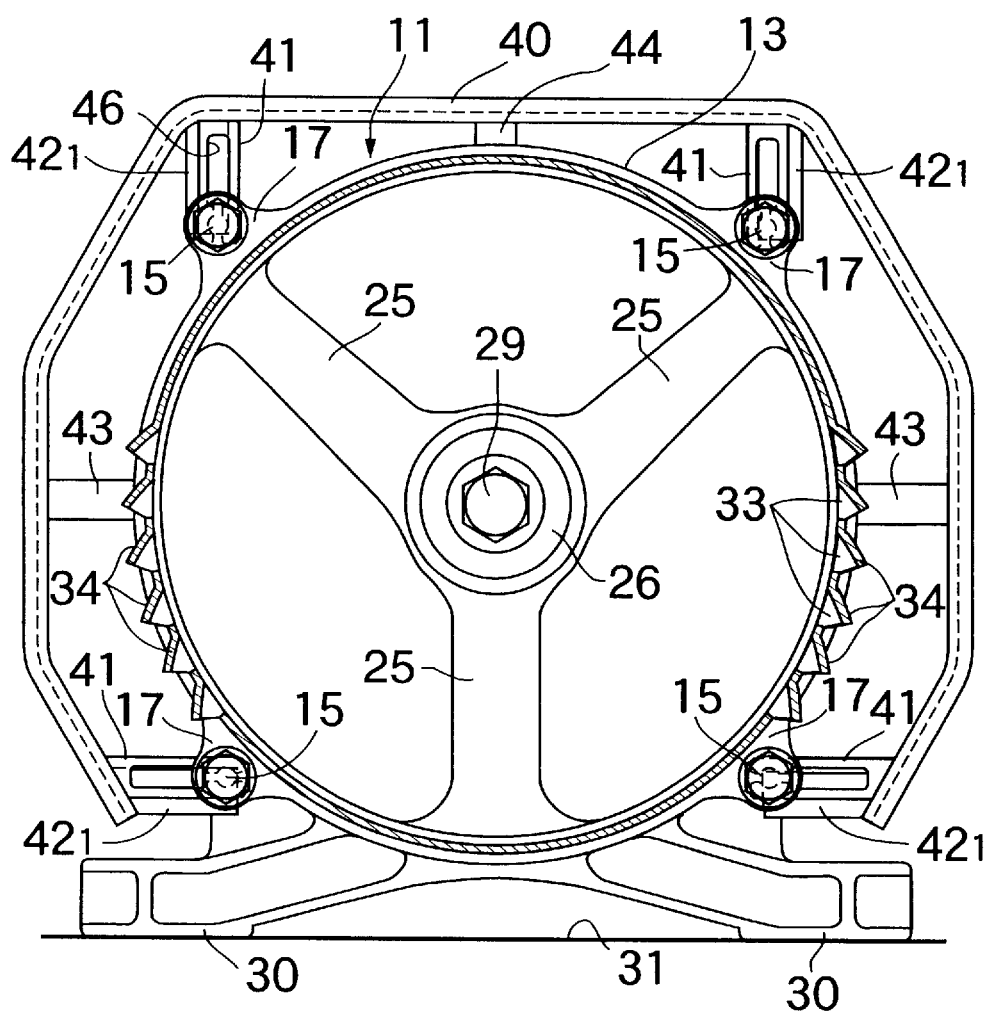
Figure 3:
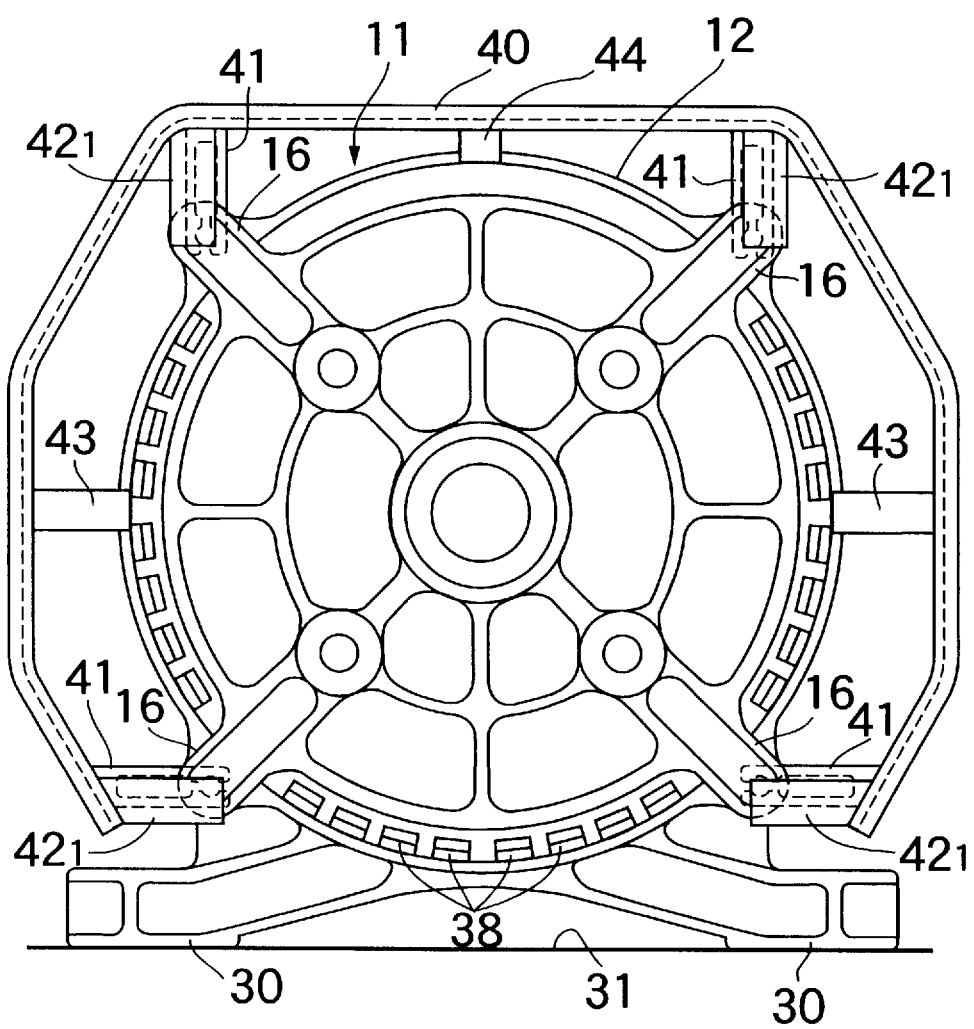
Figure 4:
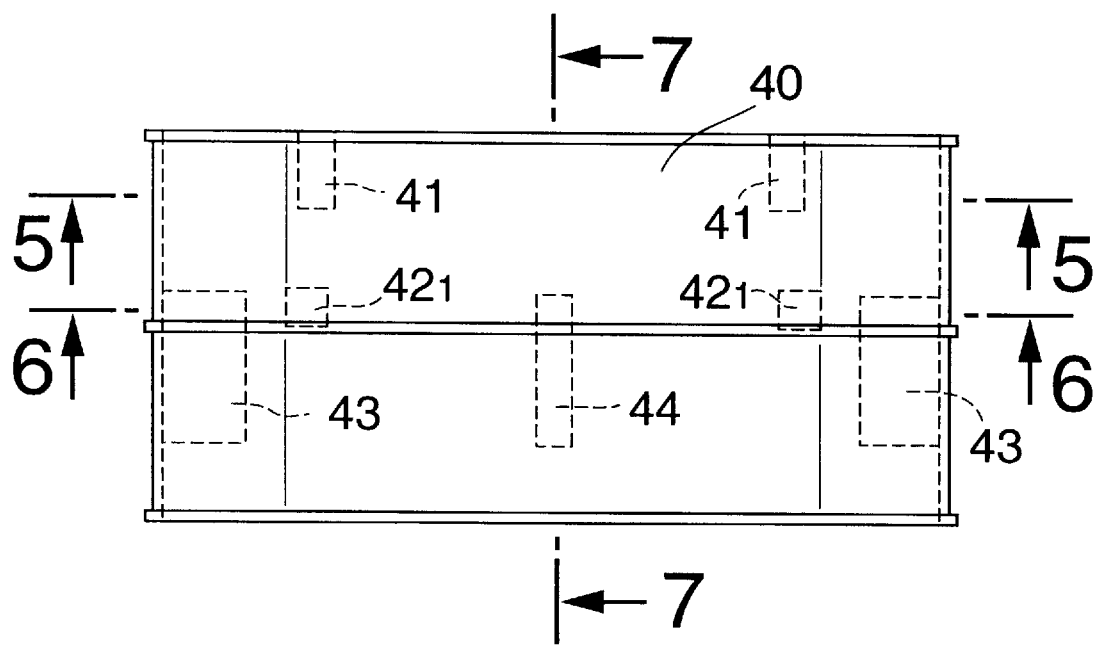
Figure 5:
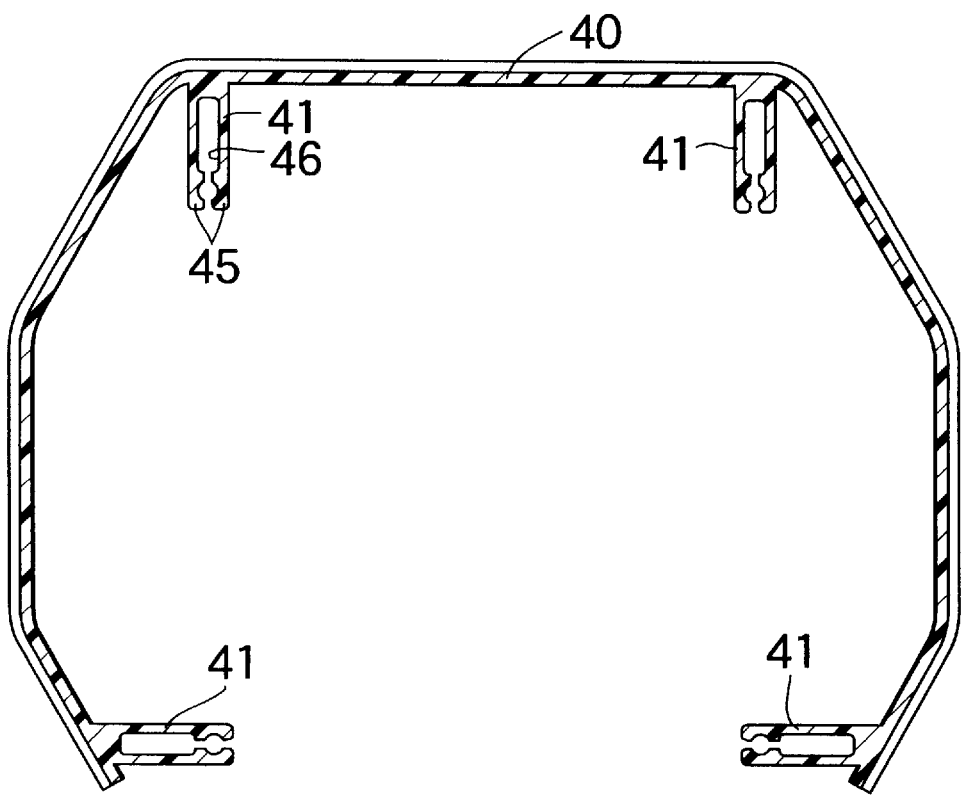
Figure 6:
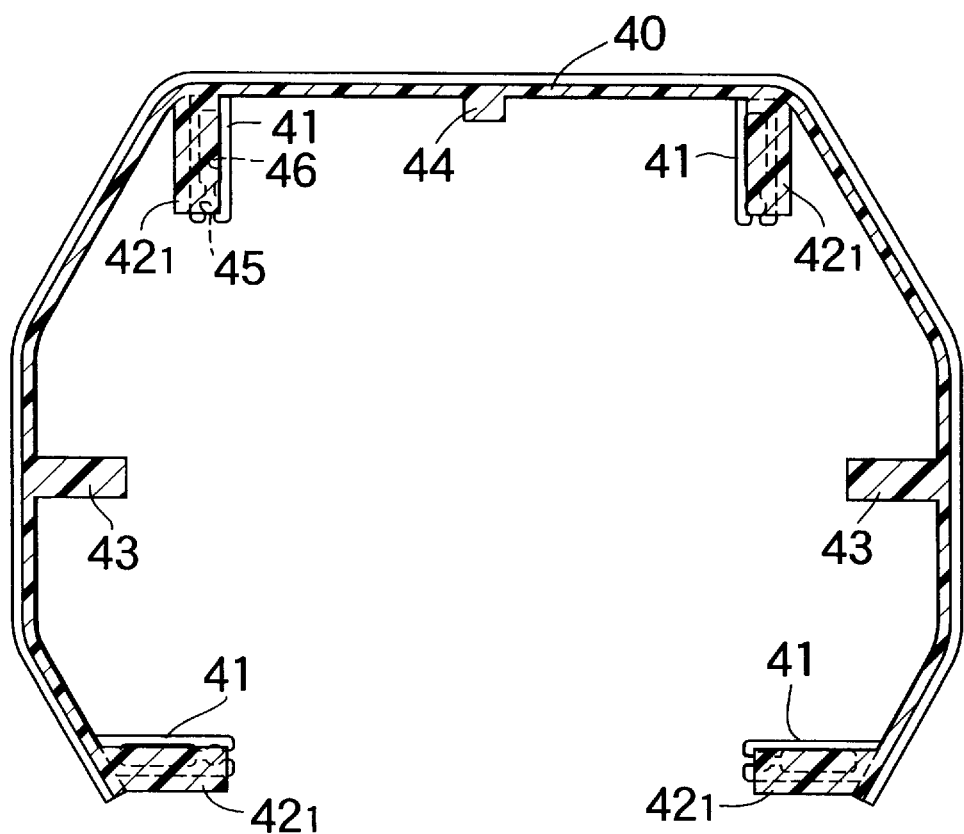
Figure 7:
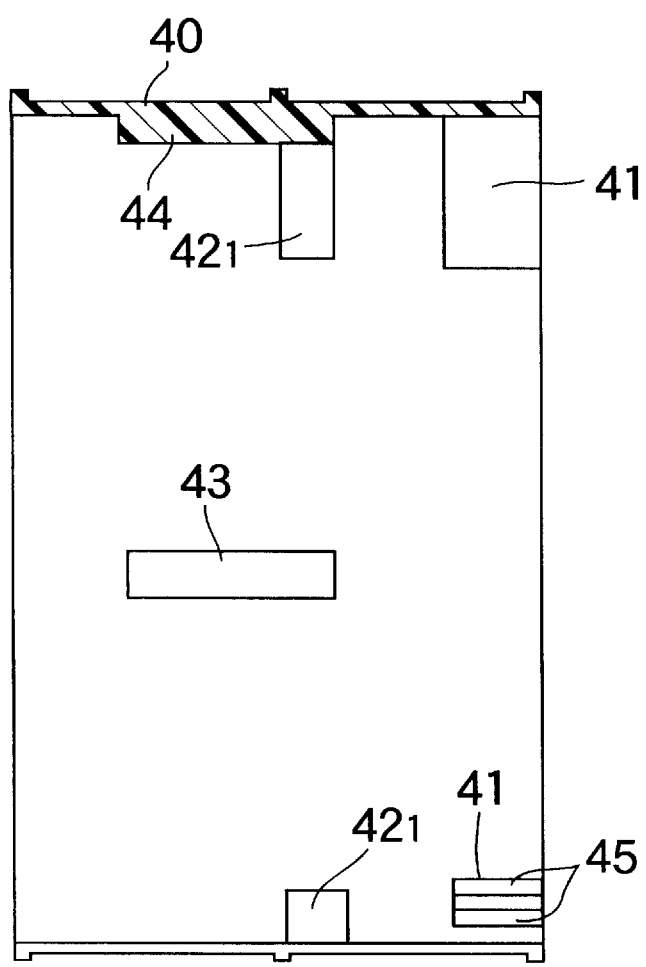

A first embodiment of the present invention will be described below with reference to FIGS. 1 through 7. Referring first to FIGS. 1 to 3, a housing 11 of this engine generator includes a front bracket 12 which is a first bracket formed in a cylindrical shape by casting and a rear bracket 13 which is a second bracket formed in a cylindrical shape by casting, the front bracket 12 and the rear bracket 13 being fastened to each other by a plurality of fastening bolts, for example, four fastening bolts 15, 15, ... with an annular core 14 interposed between the front bracket 12 and the rear bracket 13.

Four bosses 16, 16, ... are integrally formed with the external surface of the front bracket 12 at one end which faces the annular core 14, in such a manner as to project outward from positions spaced 90 degrees apart in the circumferential direction of the front bracket 12, whereas four bosses 17, 17, ... are integrally formed with the external surface of the rear bracket 13 at one end which faces the annular core 14, in such a manner as to project outward from positions individually corresponding to the respective bosses 16, 16, ... of the front bracket 12. The fastening bolts 15, 15, . . . are respectively inserted through the bosses 17, 17, . . . of the rear bracket 13 and screwed into the bosses 16, 16, . . . of the front bracket 12.

A coil 18 is wound around the annular core 14 in the housing 11 to constitute a stator 19.

An end wall 12a is integrally formed with the side of the front bracket 12 opposite to the annular core 14, and a rotating shaft 20 which is connected to an engine which is not shown is rotatably and coaxially inserted into the housing 11 through the central portion of the end wall 12a. A rotor 24 is constituted by the rotating shaft 20, a core 21 fixed to the rotating shaft 20, and a coil 23 wound around the core 21 via a bobbin 22, and the rotor 24 is coaxially surrounded by the stator 19.

Support arms 25, 25, . . . are integrally formed with an internal surface of the rear bracket 13 in such a manner as to extend radially inward from a plurality of positions, for example, three positions which are spaced apart at equal intervals in the circumferential direction of the rear bracket 13, and a bearing portion 26 is provided at the internal ends of the support arms 25, 25, . . . One end of a sleeve 28 with the core 21 fixedly fitted on outer periphery thereof is rotatably supported on the bearing portion 26 via a ball bearing 27, and one end of the rotating shaft 20 is coaxially fitted into the other end of the sleeve 28. A connecting bolt 29 which is inserted into the sleeve 28 from one end thereof is coaxially screwed into the rotating shaft 20, whereby the sleeve 28 is connected to the rotating shaft 20.

Support legs 30 and 30 which extend toward the left and right sides are integrally provided with a lower portion of the rear bracket 13, and the support legs 30 and 30 are fastened to a fixed support surface 31. An iron-made rear cover 32 which has a bottomed cylindrical shape is coaxially connected to the rear bracket 13, and a plurality of suction ports 33, 33, . . . are provided on the left and right sides and the closed end portion of the rear cover 32, and hood portions 34, 34, . . . are integrally provided with the rear cover 32 in such a manner as to cover the respective suction ports 33, 33, . . . from above.

A cooling fan 35 is secured to the rotor 24 at a position corresponding to the front bracket 12. This cooling fan 35 is formed of a synthetic resin, and a plurality of fitting projections 36, . . . each of which has elasticity by being divided into two pieces are provided on the cooling fan 35 in such a manner as to project toward the bobbin 22 of the rotor 24. Fitting holes 37, . . . into which the respective fitting projections 36, . . . are elastically fitted are provided in the bobbin 22, and the cooling fan 35 is secured to the bobbin 22, i.e., the rotor 24, by the elastic fitting of the respective fitting projections 36, . . . into the fitting holes 37,. . .

This cooling fan 35 air-cools the stator 19 and the rotor 24 by rotating together with the rotor 24, and air is introduced into the housing 11 through the suction ports 33, 33, . . . of the rear cover 32 by the rotation of the cooling fan 35. A plurality of exhaust ports 38, 38, . . . for exhausting air with the rotation of the cooling fan 35 are provided in the side wall of the front bracket 12.

To improve the cooling efficiency by smoothly exhausting air from the cooling fan 35 to the outside, the total opening area of the exhaust ports 38 needs to be made relatively large by increasing the number of the exhaust ports 38, 38, . . . to be provided in the front bracket 12, and it is desirable, therefore, to provide the exhaust ports 38, 38, . . . over a broad area of the side wall of the front bracket 12. For this reason, the exhaust ports 38, 38, . . . are disposed not only below but also above a horizontal plane which contains the axis of the front bracket 12.

If the exhaust ports 38, 38, . . . are also provided in the upper half of the front bracket 12 in this manner, rainwater may enter the housing 11 through the exhaust ports 38, 38, . . . provided in the upper half. However, in accordance with the present invention, the front bracket 12 and a portion of the annular core 14 on the front bracket 12 side are covered with a cover 40 from above.

Referring to FIGS. 4 to 7 along with FIGS. 1 to 3, the cover 40 has a substantially U-shaped cross-sectional shape which is open downward, and is formed of a synthetic resin. This cover 40 is integrally provided with four fitting portions 41, 41, . . . which respectively engage with bosses 16, 16, . . . of the front bracket 12 from the side of the annular core 14 and are elastically fitted into the respective fastening bolts 15, 15, . . . , four engagement portions $42_1$, $42_1$, . . . which respectively engage with engagement surfaces $45_1$, $45_1$, . . . which are formed on the respective bosses 16, 16, . . . on the side opposite to the annular core 14, two support portions 43 and 43 which respectively abut against the left and right side portions of the front bracket 12, and a support portion 44 which abuts against the upper portion of the front bracket 12.

The fitting portions 41, 41, . . . project inward from the inside surface of the end portion of the cover 40 which is located on the annular core 14 side. A pair of clamping portions 45 and 45 which are formed in a substantially C-shape to clamp the corresponding one of the fastening bolts 15, 15, . . . from opposite sides are formed at the end of each of the fitting portions 41, 41, . . . , and a slit 46 which enables both clamping portions 45 and 45 to elastically move toward and away from each other is provided in each of the fitting portions 41, 41, . . . Accordingly, it is possible to elastically fit the respective fitting portions 41, 41, . . . onto the fastening bolts 15, 15, . . . sideways, and when the respective fitting portions 41, 41, . . . are fitted onto the fastening bolts 15, 15, . . . , the fitting portions 41, 41, . . . are respectively brought into engagement with the bosses 16, 16, . . . from the annular core 14 side.

The engagement portions $42_1$, $42_1$, . . . project inward from the internal surface of the cover 40 in such a manner as to engage with the respective engagement surfaces $45_1$, $45_1$, . . . formed on the bosses 16, 16, . . . of the front bracket 12. Both support portions 43 and 43 are projected inward from the internal surface of the cover 40 in such a manner as to abut against the left and right side portions of the front bracket 12, and the support portion 44 projects inward from the internal surface of the cover 40 in such a manner as to abut against the upper portion of the front bracket 12. These support portions 43, 43 and 44 serve to support the cover 40 so that the cover 40 is not easily dented when an external force acts on the cover 40 made of a synthetic resin.

Then, the operation of the first embodiment will be described. In order to improve the cooling efficiency by smoothly exhausting air from the cooling fan 35 to the outside, the exhaust ports 38, 38, . . . are also disposed in the upper half of the front bracket 12 so that the total opening area of the exhaust ports 38 is made relatively large by increasing the number of the exhaust ports 38, 38, . . . provided in the front bracket 12. However, since the front bracket 12 and the portion of the annular core 14 which is located on the front bracket 12 side are covered with a cover 40 from above, rainwater is prevented from entering into the housing 11 through the exhaust ports 38, 38, . . . provided in the upper half of the front bracket 12. Accordingly, it becomes unnecessary to modify a casting die for the front bracket 12 which is a casting, and it is easily possible to provide a drip-proof structure to an engine generator which is already commercially available or in stock, by applying the cover 40 to the engine generator.

In addition, the respective fitting portions 41, 41, . . . are brought into engagement with the bosses 16, 16, . . . from the annular core 14 side, and are elastically fitted into the respective fastening bolts 15, 15, . . . Furthermore, the respective engagement portions $42_1, 42_1$, . . . are brought into engagement with the engagement surfaces $45_1, 45_1$, . . . which are formed on the respective bosses 16, 16, . . . on the side opposite to the annular core 14, so that the cover 40 can be easily fitted to the front bracket 12 while preventing the cover 40 from moving in the axial and radially outward directions of the front bracket 12.

Figure 8:
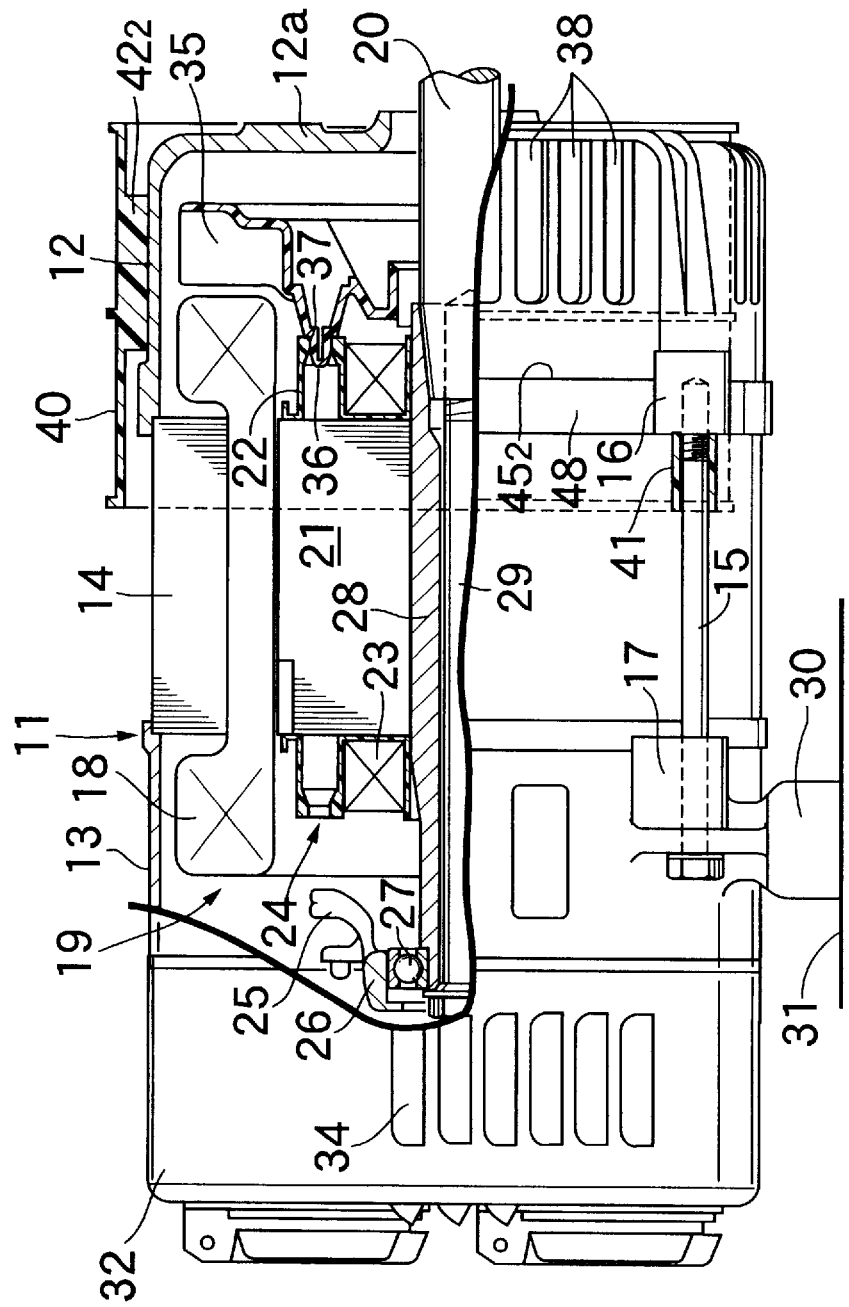
FIG. 8 is a longitudinal sectional side view similar to FIG. 1, but showing a second embodiment.

FIG. 8 shows a second embodiment of the present invention, and in FIG. 8, identical reference numerals are used to denote portions corresponding to those of the first embodiment.

In this second embodiment, instead of the engagement surfaces $45_1, 45_1$, . . . provided on the respective bosses 16, 16, . . . of the first embodiment, an annular engagement surface $45_2$ which faces the side opposite to the annular core 14 is formed at a flange portion 48 which is expanded radially outward from the end of the front bracket 12 on the annular core 14 side, and an engagement portion $42_2$ which engages with the engagement surface $45_2$ is provided on the cover 40. This engagement portion $42_2$ is formed by changing the shape of the support portion 44 of the first embodiment into a shape which engages with the engagement surface $45_2$. Accordingly, the engagement portion $42_2$ also abuts against the upper portion of the front bracket 12 and exhibits the function of a support portion which supports the cover 40 so that the cover 40 is not easily dented.

The second embodiment can also exhibit an effect similar to that of the first embodiment.

Although the embodiments of the present invention have been described above in detail, the present invention is not limited to the above-described embodiments and various modifications in design are possible without departing from the scope of the present invention set forth in the claims.

What is claimed is:

1. A drip-proof structure for an engine generator wherein first and second cylindrical brackets clamp an annular core therebetween, bosses which project outward from external surfaces of the first and second brackets are provided at a plurality of locations on the external surfaces of the first and second brackets correspondingly to each other, a housing is formed by fastening the bosses of the first and second brackets to each other with fastening bolts, a rotor is rotatably supported in the housing, a cooling fan is secured to the rotor at a position which corresponds to the first bracket, and a plurality of exhaust ports which are spaced apart in a circumferential direction are provided in a side wall of the first bracket, and wherein a cover made of a synthetic resin is provided to cover from above the first bracket having on its external surface engagement surfaces which face a side opposite to the annular core, and a part of the annular core on the first bracket side, said cover is integrally provided with a plurality of fitting portions which engage with the respective bosses of the first bracket from the annular core side and are elastically fitted with the respective fastening bolts, and engagement portions which engage with the engagement surfaces.

2. A drip-proof structure for an engine generator according to claim 1, wherein a support portion which abuts against the external surface of the first bracket is provided on the cover.

3. A drip-proof structure for an engine generator according to claim 1, wherein the engagement portions are projected inward from an internal surface of a cover so as to contact the external surface of the first bracket.

* * * * *